United States Patent [19]
Kelley

[11] Patent Number: 6,122,757
[45] Date of Patent: *Sep. 19, 2000

[54] CODE GENERATING SYSTEM FOR IMPROVED PATTERN MATCHING IN A PROTOCOL ANALYZER

[75] Inventor: Jeffrey V. Kelley, Bellevue, Wash.

[73] Assignee: Agilent Technologies, Inc, Palo Alto, Calif.

[*] Notice: This patent issued on a continued prosecution application filed under 37 CFR 1.53(d), and is subject to the twenty year patent term provisions of 35 U.S.C. 154(a)(2).

[21] Appl. No.: 08/884,143

[22] Filed: Jun. 27, 1997

[51] Int. Cl.⁷ .................... H02H 3/05; H04B 1/74
[52] U.S. Cl. .................. 714/39; 714/715; 714/735; 707/6
[58] Field of Search .............. 395/183.15, 183.17, 395/183.21; 707/6; 706/48; 364/470.06; 714/39, 41, 45, 715, 735, 738, 739

[56] References Cited

U.S. PATENT DOCUMENTS

| | | | |
|---|---|---|---|
| 4,606,069 | 8/1986 | Johnsen | 382/56 |
| 4,783,830 | 11/1988 | Johnson et al. | 382/34 |
| 4,831,580 | 5/1989 | Yamada | 345/433 |
| 4,882,756 | 11/1989 | Watari | 381/42 |
| 4,901,352 | 2/1990 | Watari | 381/43 |
| 5,014,327 | 5/1991 | Potter et al. | 382/14 |
| 5,121,465 | 6/1992 | Sakoe | 395/2 |
| 5,189,709 | 2/1993 | Wang et al. | 382/10 |
| 5,200,888 | 4/1993 | Hashimoto | 700/90 |
| 5,463,701 | 10/1995 | Kantner, Jr. et al. | 382/166 |
| 5,587,918 | 12/1996 | Hamada et al. | 364/488 |
| 5,661,763 | 8/1997 | Sands | 375/368 |
| 5,748,769 | 5/1998 | Nishimura et al. | 382/159 |
| 5,768,590 | 6/1998 | Kimura et al. | 395/702 |
| 5,916,305 | 6/1999 | Sikdar et al. | 709/236 |

*Primary Examiner*—Dieu-Minh T. Le

[57] ABSTRACT

A machine code generating system for improved pattern matching in a protocol analyzer. The code generating system includes a pattern relationship analysis phase and a pattern matching code generation phase. The pattern relationship analysis phase includes evaluating pairs of test patterns to determine the relationship that exists between each pair such as superset, subset, independent, external, and identical. The pattern matching code generation phase includes generating general pattern matching code in addition to generating specialized comparison code that is specific to the types of relationships that exist among a given set of patterns. The machine code that is generated, organizes the patterns into groups to minimize the number of pattern matching comparisons required to a minimum defined in the average case as the sum of the number of patterns and the maximum number of words per pattern. The machine code generated by the code generating system is ready to execute at the completion of the code generating system operation.

29 Claims, 6 Drawing Sheets

CODE GENERATING SYSTEM FOR IMPROVED PATTERN MATCHING IN A PROTOCOL ANALYZER

BACKGROUND OF THE INVENTION

1. Field of the Invention

This invention relates to the field of protocol analyzing systems, and more particularly to a frame relay protocol analyzing system having an improved pattern matching feature used to match anchored patterns in a protocol to enabled event triggers, filters, and/or statistical patterns in a protocol analyzer. The improved pattern matching feature exploits the relationships among the patterns being tested to facilitate automatic generation of an executable pattern matching program in real time. The executable code in the resulting pattern matching program is designed to optimize pattern matching efficiency by minimizing the number of comparisons required to identify which patterns match the input data.

2. Description of the Related Art

Pattern matching is an analysis technique commonly supported by existing protocol analyzing systems. The pattern matching technique is used to examine the data portion of individual frames that pass along a communication link between a first device and a second device. For anchored pattern matching, examining a frame means that a fixed portion of the frame is compared to a pattern to determine if that portion of the frame matches the pattern. For non-anchored pattern matching, examining a frame means that a variable portion of a frame is compared to a pattern to determine if that portion of the frame matches the pattern.

Depending on the result of a given comparison, the protocol analyzer may or may not initiate a predetermined event. For example, if a match exists between a frame and a given pattern then a predetermined event may occur. Alternatively, if a match does not exist between a frame and a given pattern then a predetermined event may not occur. Reasons for pattern matching include, but are not limited to, triggering events, capturing frames, filtering specific frames or types of frames, and identifying frame errors or statistical patterns within a series of frames.

One problem with pattern matching techniques in existing protocol analyzing systems is that they are performance inefficient. The inefficiencies are often the result of problems in the pattern matching comparison logic can that include, but are not limited to, the number of comparisons that are required between a frame and a single pattern, and the number of times a worst case comparison scenario occurs. Existing protocol analyzing systems use a brute force word-by-word comparison of a pattern against input data from a frame where the comparison process is repeated for each of a plurality of patterns that are enabled at pattern matching run time. In other words, the number of comparisons always equals the number of enabled patterns times the number of words in a pattern. This means that a word-by-word comparison will proceed even if, for example, the number of words in a pattern is greater than the number of words in the data portion of a frame so that no match could possibly occur. For a pattern matching scenario where there are 9 patterns to compare against a single frame of input data at 16 words per pattern, then 9*16=144 comparisons are required to complete the pattern matching against a single frame.

The result of the existing brute force comparison technique is that the worst case number of comparisons occurs for each of a plurality of patterns against each frame of input data. Because the overall performance of the pattern matching comparisons are determined by how quickly the worst case scenario can be processed, a given protocol analyzer using the brute force comparison technique may only be useful for monitoring low-speed communication links because the processing is so slow. One of the only ways to increase existing brute force pattern matching performance so that higher-speed communications links can be monitored is to use a higher performance processing engine in the protocol analyzer. However, using a higher performance processor can significantly increase the overall cost of the protocol analyzer thereby eliminating the market opportunity for a low-cost protocol analyzing equipment. In addition, although certain performance increases might be realized by developing alternative pattern matching comparison strategies for use with different sets of patterns, the alternative pattern matching comparison logic often requires custom pattern matching code from one set of patterns to the next and it is a problem when operator intervention is required to generate this custom code for each new set of patterns being used for each pattern matching session.

For these reasons there exists a long felt need for an improved pattern matching technique for use in a low-cost high-performance protocol analyzing system that addresses at least two problems: 1) the need for increased performance and/or efficiency of the pattern matching comparison logic for any given set of patterns; and 2) eliminating the need for operator intervention to assist in generating all or part of the program code used to execute the pattern matching comparison logic for any given set of patterns. A solution to these problems as disclosed and claimed herein has heretofore not been known.

SUMMARY OF THE INVENTION

The above identified problems are solved and an advancement made in the field by the code generating system for improved pattern matching in a protocol analyzer. The code generating system includes a pattern relationship analysis phase, the result of which is used as the basis of a pattern matching code generation phase.

The pattern relationship analysis phase includes evaluating successive pairs of test patterns to determine the relationship that exists between each pair. Evaluating the pairs of test patterns occurs for each unique set of pairs among a set of patterns and is accomplished on a word-by-word basis for each pair. Types of relationships that can exist include, but are not limited to, superset, subset, independent, exclusive, and identical. The relationships that are identified for each pair are stored in a lookup table for subsequent processing.

The pattern matching code generation phase includes generating general pattern matching code in addition to generating specialized comparison code that is specific to the types of relationships that were identified in the pattern relationship analysis phase. Generating code includes grouping sets of patterns by relationship type and identifying the pattern or patterns P that do not have subset relationships with another pattern. From the pattern P, a hierarchy of comparison code is generated based on the types of relationships that exist among the patterns so that the number of comparisons required to pattern match a given word of input data is minimized. Groups of patterns that can or cannot possibly match as a result of a given input data word comparison, are immediately ruled-in or ruled-out of contention for future comparisons to minimize the number of comparisons that are required in the average case to the arithmetic sum of the number of patterns and the number of words per pattern. The input data against which a pattern is matched is also known as a frame, frame data, or a protocol data unit. The result of the code generation phase is a run-time executable program that is ready to perform pattern matching comparisons. Numerous other features, objects, and advantages of the invention will become apparent from the following detailed description when read in conjunction with the accompanying figures.

DESCRIPTION OF THE PREFERRED EMBODIMENT

Figure 1:
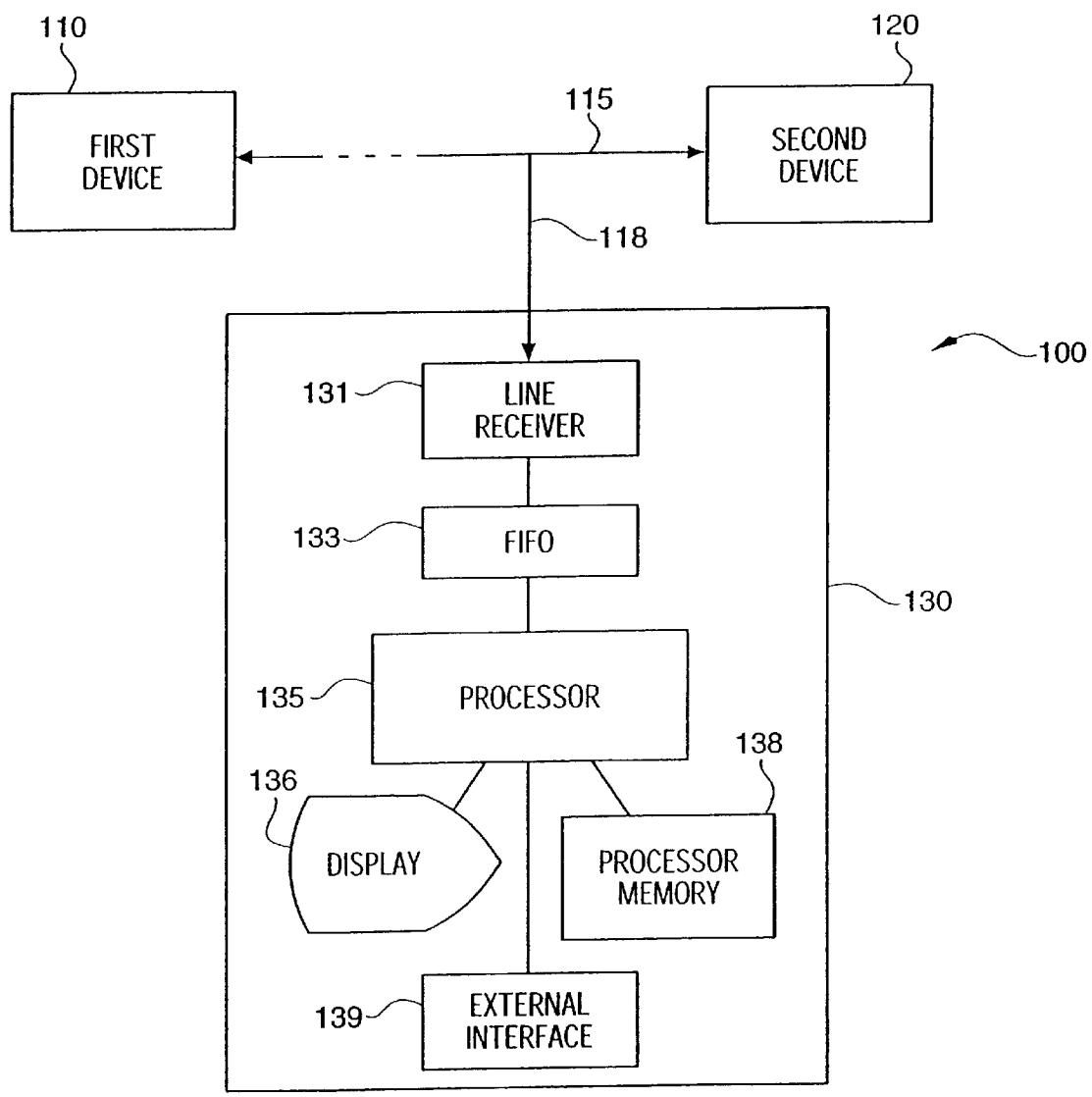
FIG. 1 illustrates a protocol analyzing system architecture and operational environment in block diagram form.
Figure 2:
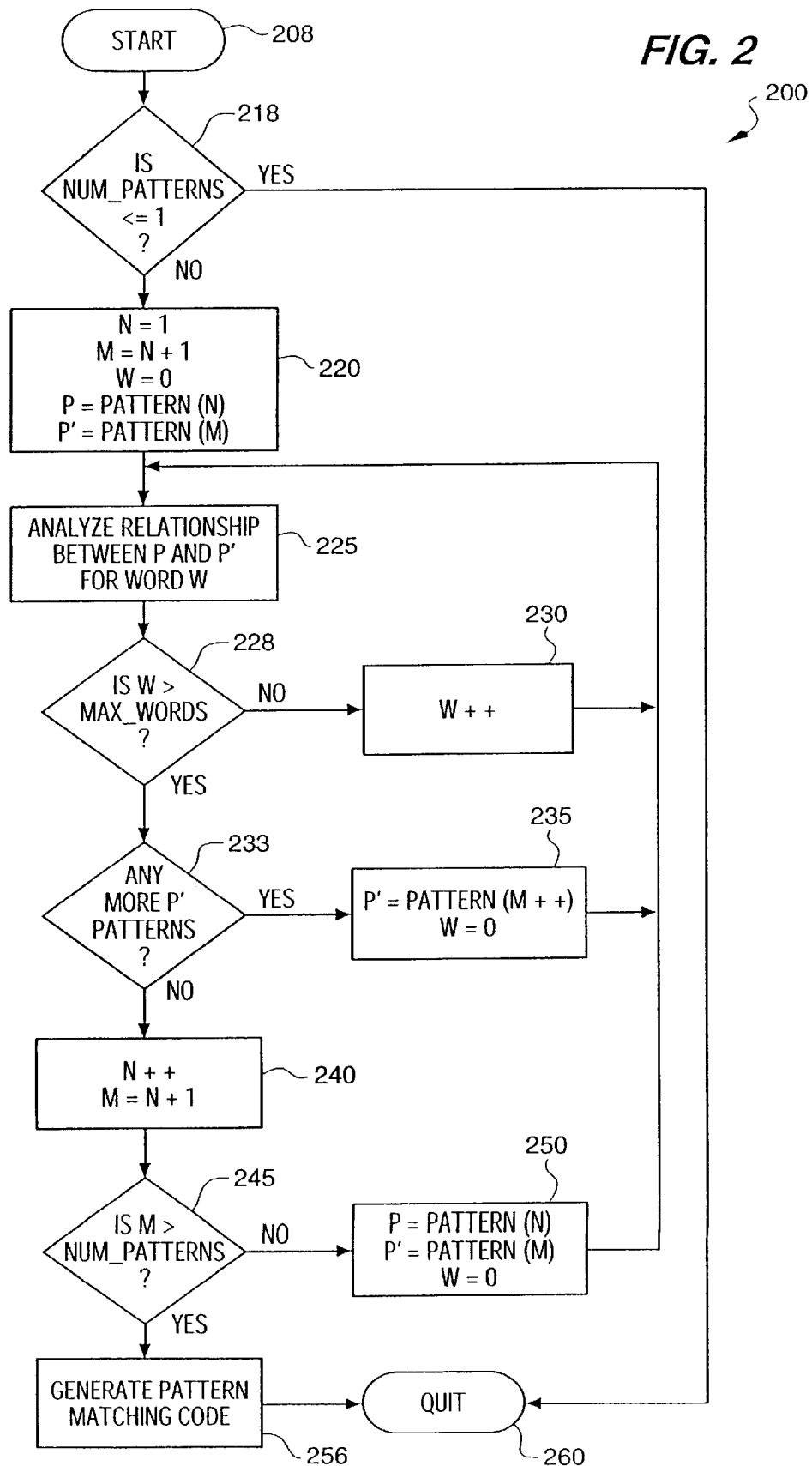
FIG. 2 illustrates an operational overview of the code generating system for improved pattern matching in flow diagram form.

Architectural Overview—FIGS. 1–2

FIG. 1 illustrates an exemplary protocol analyzing system architecture and operational environment 100 in block diagram form. The architecture and operational environment 100 includes, but is not limited to, a protocol analyzing system 130, a first device 110 under test, and a second device 120 under test. The first device 110 and the second device 120 have a communication link 115 therebetween. A drop line 118 connects the protocol analyzing system 130 to the communication link 115.

Protocol analyzing system 130 includes, but is not limited to including, a line receiver 131, a First-In-First-Out (FIFO) buffer 133, a processor 135, an optional display 136, a processor memory 138, and an external interface 139. The line receiver 131 receives raw frame input from communication link 115 by way of drop line 118. The raw frame input can be filtered by a preliminary filter in line receiver 131 as needed. For example, a significant portion of the administrative fields of a frame or a packet can be eliminated so that only the data fields are passed to the FIFO 133 to await subsequent processing. The FIFO 133 that queues data for subsequent processing can be implemented as any other type of buffer and the need or criteria for such an alternative implementation is beyond the scope of the present invention.

Processor 135 performs tasks that include, but are not limited to, the code generating system and improved pattern matching techniques of the present invention. Display 136 can be an internal display as an integral part of the protocol analyzing system 130 itself. Alternatively or in combination with an internal display, display 136 can be an external display operably connected to the protocol analyzing system 130 by way of a display connection interface in a manner well known in the industry. In either case, display 136 is controlled by processor 135 to display real-time or replayed materials.

Processor memory 138 can be a volatile and/or nonvolatile memory that performs a primary role of supporting operations of the processor 135. External interface 139 is controlled by processor 135 and performs a primary role of passing input and/or output to and/or from an externally connected device such as a Personal Computer (PC). An externally connected PC can be used to perform tasks that include, but are not limited to, additional post processing on raw data passed through the protocol analyzing system 130, storing and/or viewing real-time data or other information, downloading programs or processing instructions, and/or uploading real-time or temporarily stored processing statistics provided by the protocol analyzing system 130. An exhaustive listing of possible tasks and/or features other than pattern matching that are supported by a protocol analyzing system 130 are beyond the scope of the present invention.

FIG. 2 illustrates an overview of the operational steps 200 in flow diagram form for the code generating system for improved pattern matching. The operational steps 200 can be divided into two main processes that include, but are not limited to, pattern relationship analysis of steps 218–250, and pattern matching code generation of step 256. More specifically, the pattern relationship analysis of steps 218–250 include the steps illustrated in FIG. 4, and the pattern matching code generation of step 256 includes the steps of FIGS. 5–6.

The operational steps 200 begin with step 208 and can be the result of a default process set in motion by powering up or recycling power on the host protocol analyzing system 130. Alternatively, the operational steps 200 can be executed on demand a user or in response to any other input or command from a source internal or external to the protocol analyzing system 130. For example, a user could construct or retrieve a stored set of patterns that are useful for a particular communication link monitoring purpose, and communicate a request that the protocol analyzing system 130 prepare and execute pattern matching on the selected set of patterns. In response to such a request, the protocol analyzing system 130 would perform the operational steps 200 beginning at step 208 in a manner as disclosed herein.

Note that the pattern relationship analysis steps 200 are only one example of how the relationships between each pattern in a set of patterns can be determined. Other methods can be use and are considered within the scope of the present topic of pattern relationship analysis. The text below accompanying FIG. 2 illustrates a method for evaluating relationships takes advantage of the symmetry of pattern relationships by recognizing that if pattern 1 is identical to pattern 2 then pattern 2 is also identical to pattern 1. Similarly, if pattern 1 is a superset of pattern 2 then pattern 2 is a subset of pattern 1 and so on. Thus, the example pattern relationship analysis steps 200 evaluate any pair of patterns against each other only once by evaluating pattern 1 against pattern 2 through NUM_PATTERNS, and pattern 2 against pattern 3 through NUM_PATTERNS, and so on.

If it is determined a decision step 218 that the total number of patterns NUM_PATTERNS is less than or equal to 1, then processing quits at step 260 because there are no patterns to analyze against each other. That is, the purpose of the pattern relationship analysis steps 218–250 are to evaluate relationships among two or more patterns and exploit the relationships that exist among the patterns toward an end of maximum efficiency in pattern matching by minimizing the number of comparisons required between an input data and each of a set of patterns. Alternatively, if it is determined at decision step 218 that NUM_PATTERNS is greater than 1, then there are at least two patterns that can be analyzed for relationships and processing proceeds to step 220.

At step 220, the variables N, M, and W, are set to 1, N+1, and 0 respectively. The variable N represents an index number for the outer loop base pattern. The variable M represents an index number for the inner loop base pattern. The variable W represents an index number for the present word in a given pattern. Further in step 220, a first pattern P is set to represent pattern N of the total number of patterns, and a second pattern P' is set to represent pattern M of the total number of patterns. At step 225, word W of the patterns P and P' are analyzed to determine their relationship type. A complete overview of pattern relationship types is disclosed in the text accompanying FIG. 3.

If it is determined at decision step 228 that the word index W is less than or equal to the maximum number of words MAX_WORDS in any one of the patterns, then processing continues at step 230 so that a word by word evaluation of P and P' continues until all words in the patterns have been analyzed and the relationship between P and P' is ultimately determined. Note, that the relationship between P and P' can differ from word to word. The results of the relationship analysis for each word comparison is stored and indexed in a memory for subsequent use during code generation. At step 230 the word index W is incremented by one and the relationship analysis of word W of patterns P and P' proceeds at step 225 as previously disclosed. Alternatively, if it is determined at decision step 228 that word index W is greater than the maximum number of words MAX_WORDS, then processing continues at step 233.

If it is determined at decision step 233 that there are more P' patterns among the total number of patterns, then processing continues at step 235 until all P' patterns have been evaluated for relationships with P. At step 235, P' is set to represent a next pattern M++. Alternatively, if it is determined at decision step 223 that there are no more patterns P' that require analyzing for relationships with P, then processing continues at step 240. At step 240 the outer loop variable N is incremented by one and the inner loop variable M is set to N+1, and processing continues at step 245.

If it is determined at decision step 245 that the inner loop variable M is not greater than the total number of patterns meaning that there is at least one more pair of patterns P and P' that have not yet been analyzed together for a potential relationship, then processing continues to step 250. At step 250, P is set to represent a new pattern number M, and P' is set to represent a new pattern number M. Variable W is also reset to 0 as an index to the $0^{th}$ byte of patterns P and P' and processing continues at step 225 as previously disclosed. Alternatively, if it is determined at decision step 245 that there are no more un-analyzed pairs of patterns P and P', then processing continues to step 256.

At step 256 the program code that is used to implement the improved pattern matching of the present invention is dynamically generated. The dynamically generated program code includes custom program code that is indicative of the unique relationships discovered among the patterns evaluated in the pattern relationship analysis steps 218–250 of the present invention. When the code generating step 256 is complete, a fully operational function or subroutine exists for the improved pattern matching techniques. Processing stops at step 260.

Figure 3:
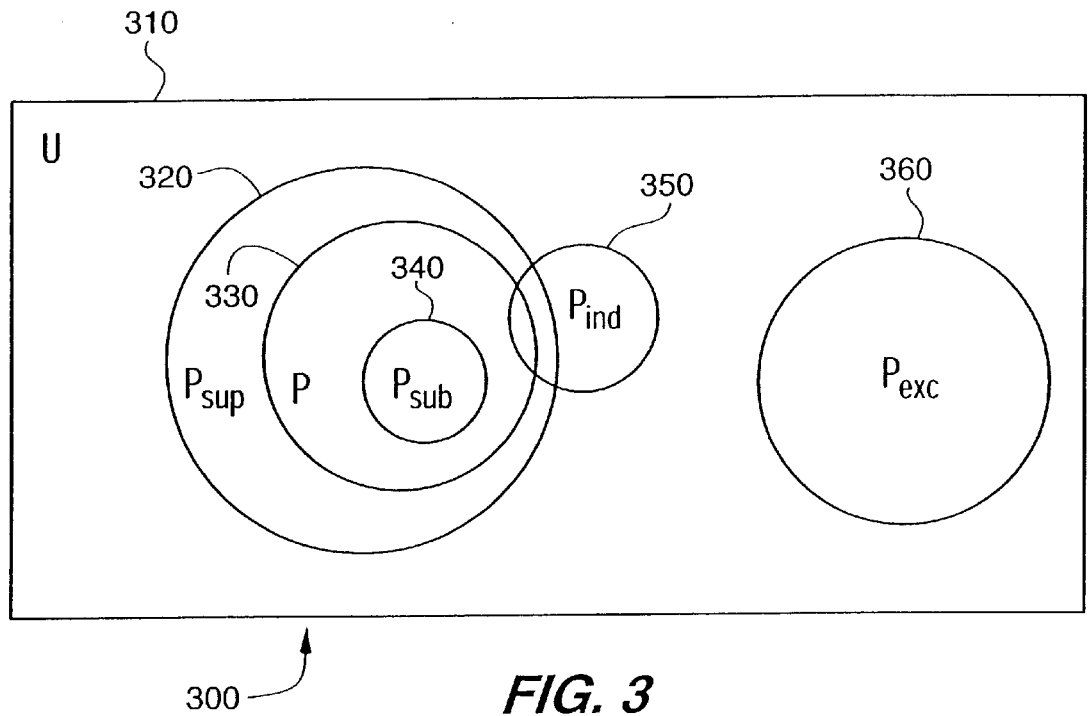
FIG. 3 illustrates the potential relationships that can exist between patterns in Venn diagram form.

Pattern Relationship Overview—FIG. 3

FIG. 3 illustrates the types of relationships that can exist in Venn diagram form 300 among a set of patterns. The set U 310 represents the universe of all possible input data that can be received for pattern match processing. The set P 330 represents a pattern that matches the input data that falls within its set. From this baseline, all other P' patterns can be analyzed to determine the relationship between P and any given P'. Pattern $P'_{sub}$ 340 is a subset relationship of the pattern P 330 so that any input data matching $P'_{sub}$ will also match the pattern P 330. Alternatively, pattern $P'_{sup}$ 320 is a superset relationship of the pattern P 330 so that any input data matching P 330 will also match the pattern $P'_{sup}$ 320.

Pattern $P'_{ind}$ 350 is an independent relationship of the pattern P so that no conclusive relationship can be determined because any input data matching $P'_{ind}$ 350 may or may not match pattern P 330. Pattern $P'_{exc}$ 360 is an exclusive relationship of the pattern P 330 so that any input data matching $P'_{exc}$ 360 will by definition not match pattern P 330 and vice-versa. Finally, an identical relationship may also exist between two patterns where input data that matches a first pattern must exactly match the identical second pattern and vice-versa. Note also that by choosing a new pattern P as the baseline from which pattern relationships are analyzed, additional subset, superset, independent, and exclusive relationships can be identified and exploited toward an end of minimizing the number of frame data and pattern comparisons that must take place during pattern matching execution.

A three digit binary example of the patterns and their relationships is illustrated in Table 1. Note that the typical binary digits "1" and "0" exist in addition to "x" which represents a "don't care" or match anything digit.

TABLE 1

| | |
|---|---|
| P | 11x |
| $P'_{sub}$ | 111 |
| $P'_{sup}$ | 1xx |
| $P'_{ind}$ | 1x1 |
| $P'_{exc}$ | 0xx |

By exploiting the known relationships among the various patterns, the number of comparisons in a pattern matching exercise can be greatly reduced. For example, in a scenario where there are 9 patterns having 16 words per pattern, there need only be 9+16=25 comparisons in the average worst case comparison scenario. However, where the patterns are independent of each other, the absolute worst case comparison scenario, although far less common, still requires 9*16=144 comparisons.

Figure 4:
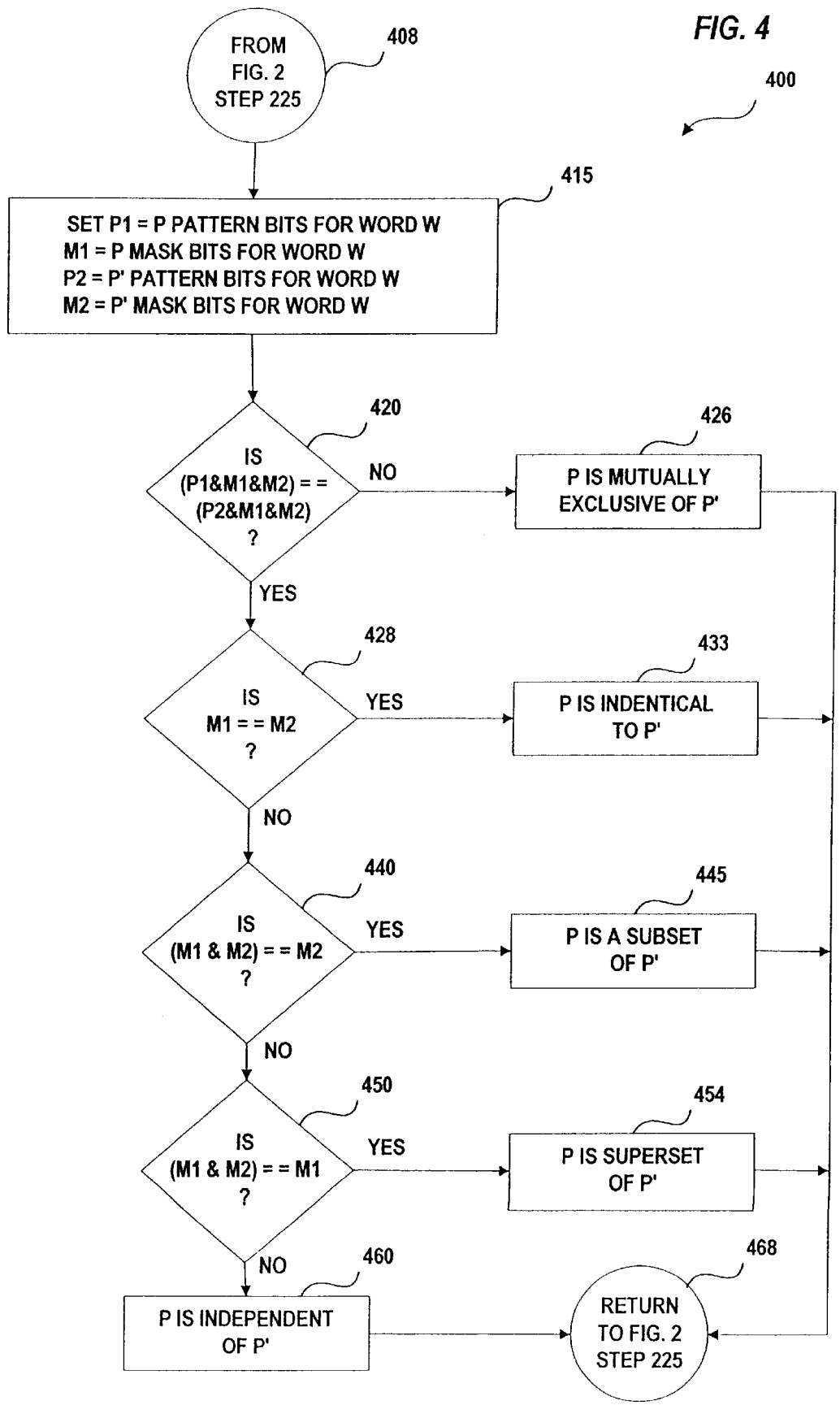
FIG. 4 illustrates details of the pattern relationship analyzing steps in flow diagram form.

Pattern Relationship Analysis Details—FIG. 4

FIG. 4 illustrates the operational details of the pattern relationship analysis steps 400 in flow diagram form. The pattern relationship analysis steps 400 begin at step 408 and are the details of step 225 from FIG. 2. At step 415, P1 and P2 are set to the pattern bits for word W of the patterns P and P' respectively. Similarly, M1 and M2 are set to the mask bits that correspond to the patterns P and P' respectively. The remaining steps 420 through 460 identify the type of relationship that exists between the present patterns P and P' and that relationship is cataloged and stored in a memory for future use in the code generating steps disclosed in the text accompanying FIGS. 5–6.

Note that each bit in a pattern P has a corresponding bit in a mask M due to the difficulty in representing any one of three pattern states with a single bit. In theory, there are three states that are represented by a given pattern bit that include a 1, 0, and x, where x represents a "don't care" bit. However in practice because any bit by itself can only be either a 1 or a 0, representing a "don't care" state requires a mask bit that corresponds to each pattern bit. Thus, referring to a three bit pattern as "one, one, don't care", requires viewing the first three bits of the pattern "111" and the first three bits of the corresponding mask "110" where a 0 mask bit represents a "don't care" pattern bit position and a 1 mask bit represents a "care" or "as stated" pattern bit position. In other words, in the above example it does not matter if the third bit in the pattern "111" is a 1 or a 0 because the third bit in the mask "110" indicates that the third pattern bit can be ignored as a "don't care."

If it is determined at decision step 420 that the result of ANDing P1, M1 and M2 does not equal the result of ANDing P2, M1 and M2, then pattern P is a mutually exclusive relationship with pattern P' and processing continues at step 468. Alternatively if it is determined at decision step 420 that the result of ANDing P1 and M1 does equal the result of ANDing P2 and M2, then processing continues at step 428.

If it is determined at decision step 428 that M1 is equal to M2, then pattern P is an identical relationship to the pattern P' and processing continues at step 468. Alternatively, if it is determined at decisions step 428 that M1 is not equal to M2, then processing continues at step 440.

If it is determined at decision step 440 that the result of ANDing M1 and M2 is equal to M2 itself, then pattern P is a subset relationship of P' and processing continues at step 468. Alternatively, if it is determined at decision step 440 that the result of ANDing M1 and M2 is not equal to M1 itself, then processing continues at step 450.

If it is determined at decision step 450 that the result of ANDing M1 and M2 is equal to M1 itself, then pattern P is a superset relationship of P' and processing continues at step 468. Alternatively, if it is determined at decision step 450 that the result of ANDing M1 and M2 is not equal to M2 itself, then processing continues at step 460. If processing reaches step 460 then the relationship between pattern P and pattern P' is an independent relationship and processing continues at step 468.

Figure 5:
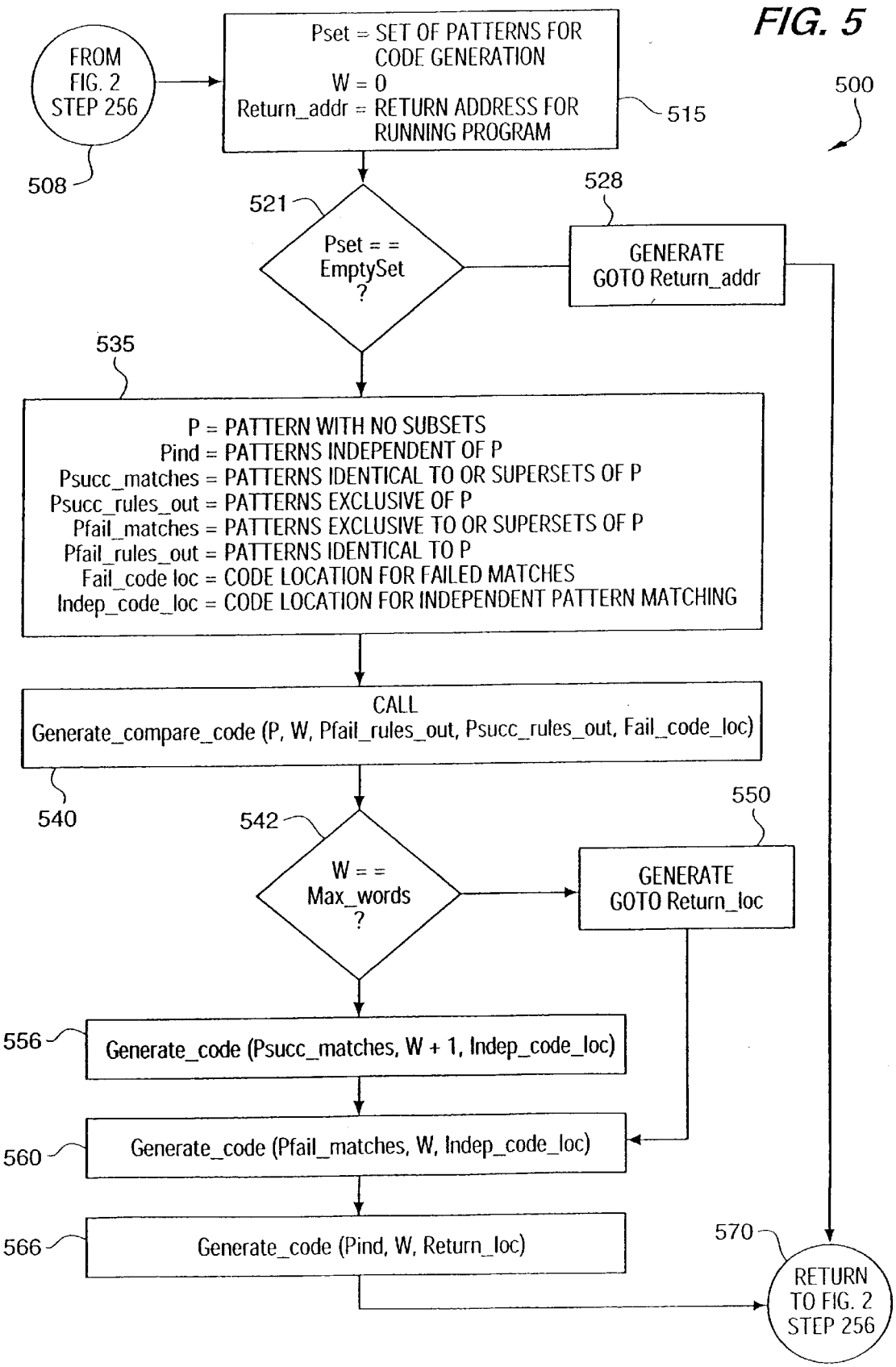
FIG. 5 illustrates an operational overview and details of code generating steps in flow diagram form.
Figure 6:
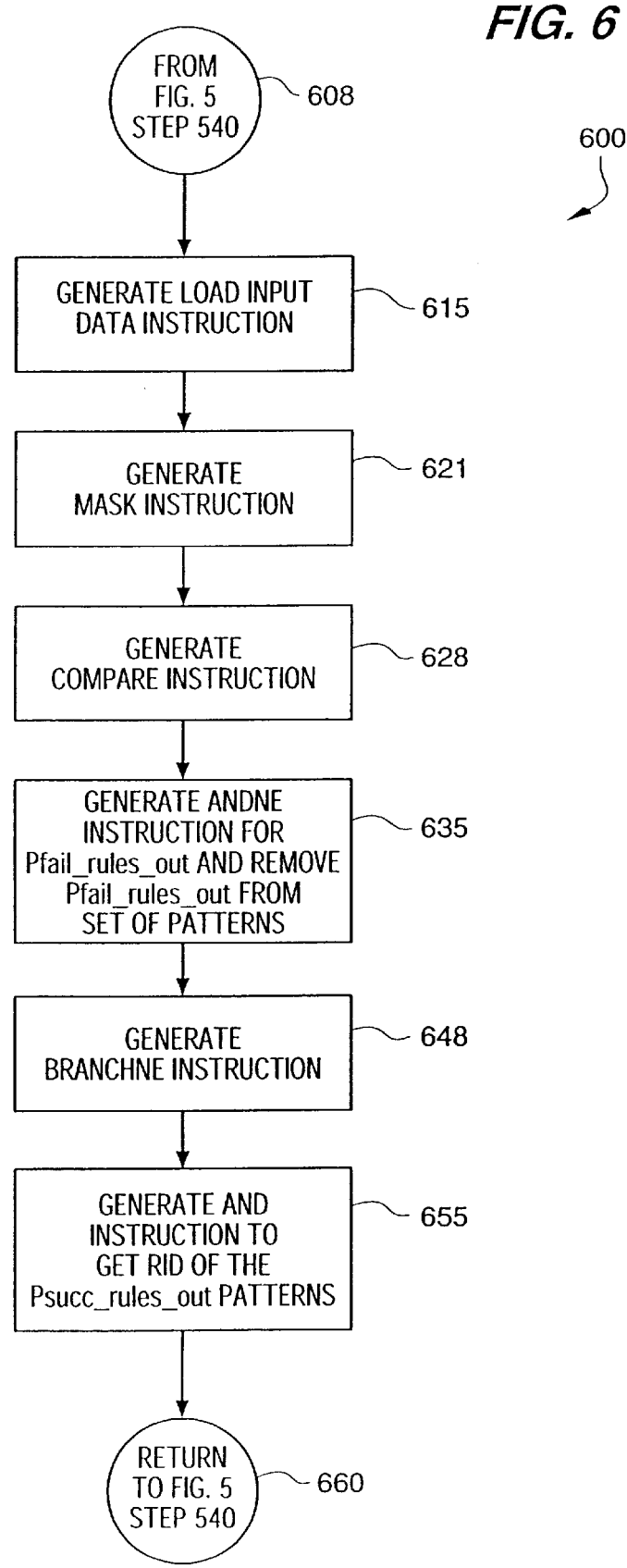
FIG. 6 illustrates details of comparison code generating steps in flow diagram form.

Generating Pattern Matching Code—FIGS. 5–6

FIG. 5 illustrates an operational overview of the code generating steps 500 in flow diagram form. The code generating steps 500 dynamically generate operational machine code that can be run as the improved pattern matching feature for the protocol analyzing system 130. Key to the generated code is that it embodies the most advantageous characteristics of the pattern relationships previously identified. Specifically, the resulting generated code is a custom designed function or subroutine that takes full advantage of the pattern relationships toward an end of minimizing the number of comparisons that are required at pattern matching run time between input frame data and any one pattern.

For example, the generated code is ideally based on pattern relationships such that comparing a pattern P1 to any set of input data immediately includes or rules out the need to compare some number of subsequent related patterns P2–P3. Ruling out unnecessary pattern and input data comparisons is most effectively realized if pattern P1 is a pattern that has no subsets. That is, if P1 is a subset of P2, and P2 is a subset of P3, then ruling out P1 as a match with a given input data by definition rules out P2 and P3. Similarly, a match with P1 means that at least P2 must then be compared and so on. However, each comparison is on a word by word basis between a pattern and an input data. This means that the best pattern to use for matching with a given word of input data may change from one word to the next depending on the pattern relationships that exist for each word in each pattern. Using this approach, the greatest number of matches that are required on the average is the sum of the number of patterns and the number of words per pattern. Alternatively, if P1, P2 and P3 are patterns with no supersets, then the generated code is constructed to continue comparing each word of each pattern until no match is found which could be a worst case scenario.

The code generating steps 500 begin at step 508 and are the details of step 256 from FIG. 2. At step 515, variable Pset represents the set of patterns for which code will be generated, and W represents the present word number of the input data to be tested, which starts at word 0 the first word, and proceeds through to MAX_WORDS. The variable Return_Addr represents the address or symbolic address to which the run-time function will return when it exits.

If it is determined at decision step 521 that the set Pset is an empty set, then the program instruction GOTO Return_Addr is generated at step 528 and the code generating process is complete at step 570. Alternatively, if it is determined at decision step 521 that the set Pset is not an empty set, then processing continues at step 535. At step 535, the operational variables are set that are required for a successful call to the compare code generating steps of FIG. 6. The variable P is set to a pattern P in Pset that has no subset patterns. The variable $P_{ind}$ represents the set of patterns in Pset that are independent of P. The variable Psucc_matches represents the patterns in Pset that are identical to or are supersets of P, and these are the set of patterns that may match the input data that matches P itself. The variable $Psucc_{13}$ rules_out represents the patterns in Pset that are exclusive of P, and these are the patterns that cannot match the input data if the input data matches P. The variable Pfail_matches represents the patterns in Pset that are exclusive to or are supersets of P, and are the set of patterns that may match the input data it the input data does not match P. The variable Pfail_rules_out represents the patterns in Pset that are identical to P, and these are the set of patterns that cannot match the input data if the input data does not match P. And finally, the variable Fail_code_Loc represents the location where code will be generated if the input data does not match P, and the variable Indep_Code_Loc represents the location of program code where independent patterns are handled. At step 540, the above identified variables are included in a call to the compare code generating steps that are detailed in FIG. 6.

If it is determined at decision step 542 that the present word number index W is equal to the maximum number of words in a pattern MAX_WORDS, then this is the last word on which a comparison is performed so a branch program instruction is generated to GOTO Return_Loc at step 550 and processing continues at step 560. Alternatively, if it is determined at decision step 542 that the present word number index W is not equal to the maximum number of words in a pattern MAX_WORDS, then subsequent comparisons can occur so processing continues to step 556.

Steps 556, 560, and 566 are recursive calls the code generating steps 500 to continue generating code for special case situations. At step 556, the code generating steps 500 are recursively called to generate code to test the next word of input data against the set, for the set of patterns represented by the variable Psucc_matches. Similarly, at step 560 the code generating steps 500 are recursively called to generate code for the set of patterns represented by the variable Pfail_matches. And finally, at step 566 the code generating steps 500 are recursively called to generate code for the set of patterns represented by the variable $P_{ind}$. When processing is complete from all recursive calls to the code generating steps 500, processing continues at step 570. FIG. 6 illustrates details of the comparison code generating steps 600 in flow diagram form. The comparison code generating steps 600 begin at step 608 and are the details of step 540 from FIG. 5. Note that depending on the programming language and detail of the program code being generated, one or more program language instructions may be generated for any of the following steps.

At step 615, a program instruction is generated to load word W of the input frame data into a register or memory location so that the data can be compared to a pattern. At step 621, a program instruction is generated to perform an AND of the word W of the mask of pattern P against the corresponding word of the input data, to mask off any "don't care" bits.

At step 628, a program instruction is generated to compare word W of pattern P with word W of the input frame data. At step 635, a program instruction is generated for the condition where result of the pattern and data comparison is not equal or otherwise failed to match, so that the patterns in the set Pfail_rules_out are eliminated from the set of patterns that must be subsequently compared to the input frame data. At step 648, a program instruction is generated to branch to Fail_Code_Loc if the result of the pattern and data comparison is not equal or otherwise failed to match.

At step 655, an AND program instruction is generated to eliminate the patterns in the set Psucc_rules_out because pattern P was a match therefore none of the set Psucc_rules_out can match. Processing continues at step 660.

The overall logic of the pattern matching code that is generated by the steps in FIGS. 5–6 can be summarized in the following manner for each comparison that is done to compare a word of input frame data with a word of pattern P. Once a comparison is complete, if there is a match then all patterns exclusive to P deleted because they are not needed for future comparisons and comparisons of remaining patterns will continue. Alternatively, if there is not a match, then all patterns identical to P are deleted because they are not needed for future comparisons and comparisons of remaining patterns independent of P will continue.

Note that the ideal pattern to use in the comparisons is a pattern P that has no subsets so that the maximum number of comparisons required to compare input data to a given pattern is at most the sum of the number of patterns and the number of words in each pattern, assuming no independent patterns exist. Further, additional efficiencies can be built into preparing to execute the code generated code by the present invention. One efficiency includes the application of a mask to its pattern prior to run-time to identify or eliminate pattern bits that are "don't care" bits. Another efficiency includes identifying words of a pattern that contain all don't care bits because it is not necessary to compare such a word to anything because a match will always result.

Finally, the code generated by the present invention is an unrolled recursive call tree, and branches are used in the code rather than subroutine calls where ever possible to enhance run-time performance of the generated code. The choice to generate the unrolled recursive call tree code during pattern configuration is a performance optimization. An alternative implementation could choose to use run-time recursion, accepting whatever performance penalties occur. Such an alternative run-time recursive function would look similar to the function disclosed in the pseudo-code example below. The functions in the pseudo-code example that include no_subsets, supersets, exclusive, identical, and independent, are called by the recursive function used to generate the pattern relationship database that was constructed during the pattern relationship analysis steps disclosed in the text accompanying FIG. 2.

Pseudo-Code Example

```
matching_patterns
find_pattern_matches (input, patterns, wordnum)
/*
* Parameters:
*    input - input data to be matched against patterns
*    patterns - set of patterns to test against input
*    wordnum - word to start matching against [0
.MAX_PATTERN_WORDS]
* Return value:
*    Those patterns in 'patterns' matching 'input' from 'wordnum' on.
*/
{
   if ( emptyset (patterns) )
      /* No patterns to test for matches */
      return patterns;
   if ( wordnum >= MAX_PATTERN_WORDS )
      /* All words of patterns matched, no more words */
      return patterns
   P = member_of (patterns) && no_subsets (P, patterns)
   if ( matches (input, P, wordnum))
      /* P matches => all its supersets also match */
      matching_patterns =
      find_pattern_matches (input, identical (P) OR supersets
(P),wordnum+1))
   else
      /* P doesn't match, exclusive and supersets may match */
      matching_patterns =
      find_pattern_matches(input, superset(P) OR exclusive(P), wordnum)
   /* Look for matches of independent patterns */
   matching_patterns |= find_pattern_matches (input, independent(P),
wordnum)
   return matching_patterns;
}
```

Figure 7:
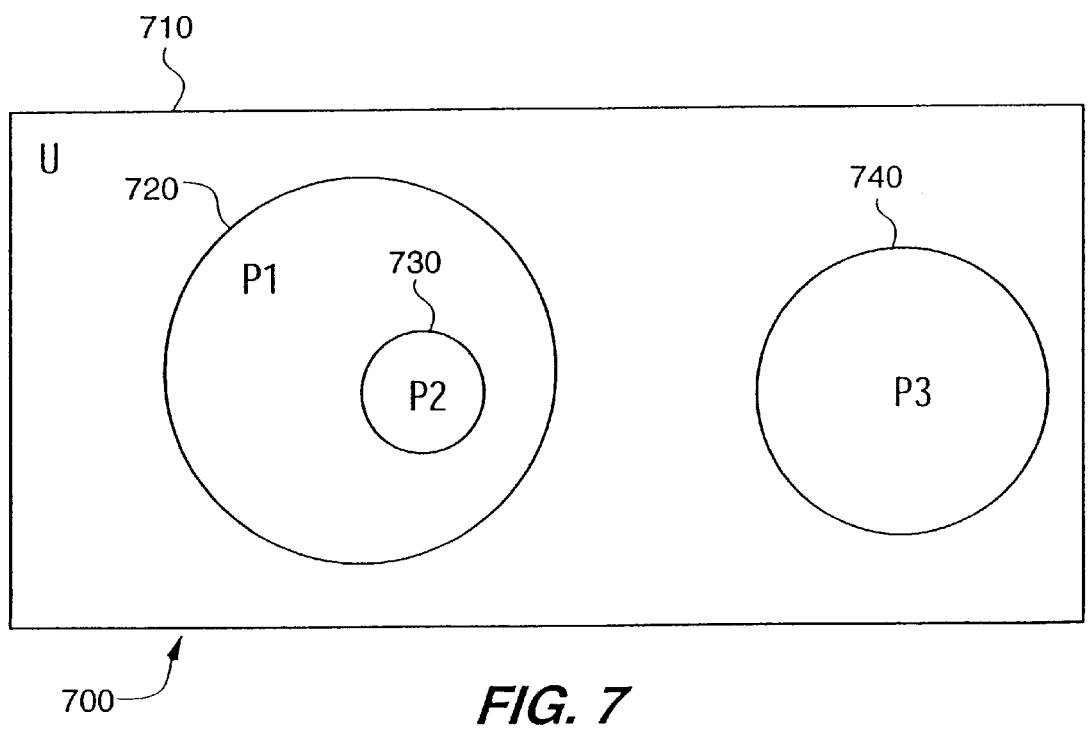
FIG. 7 illustrates a Venn diagram of pattern relationships for purposes of a working example of the code generating system for improved pattern matching.

Working Example—FIG. 7

FIG. 7 illustrates a Venn diagram 700 of pattern relationships for purposes of a working example of the code generating system for improved pattern matching of the present invention. The Venn diagram 700 includes the universe of all input frame data 710, and three patterns P1 720, P2 730, and P3 740. Pattern P1 720 is a superset of P2 730, or conversely, P2 730 is a subset of P1 720. In either case, pattern P3 740 is exclusive of both patterns P1 and P2. For purposes of example only, assume that the patterns for P1, P2, and P3 are those illustrated in Table 2.

TABLE 2

| |
|---|
| P1 = 1xxxx |
| P2 = 11xxx |
| P3 = 0xxxx |

Assuming for example purposes that the pattern relationship analysis is complete so that the relationships are known as stated above, the pattern relationship analysis of FIGS. 2 and 4 would look like the following in terms of a notation of Pn.w where n is the pattern number and w is the word index number within the pattern. For the present example the word number is 0 due to the minimal length of the present example for simplicity purposes. The results of the relationship analysis are stored in a cleared memory and more specifically can be stored as a database of relationships.

Step 1—Analyze Pattern Relationships a. Compare P1.0 with P2.0 and record relationship that P2.0 is a subset of P1.0.

b. Compare P1.0 with P3.0 and record relationship that P3.0 is exclusive of P1.0.

c. Compare P2.0 with P3.0 and record relationship that P3.0 is exclusive of P2.0.

Executing the code generating steps disclosed in the text accompanying FIGS. 5–6 would look like the following the patterns listed in Table 2 and based on the previously identified pattern relationships as discussed in step 1 above.

Step 2—Generate Code a. Call Generate_Code with a Pset of (P1, P2, P3) and word=0.

b. Find a pattern in Pset having no subsets, starting with P1.

P2 is a subset of P1 so P1 is no good.

Next look at P2.

P2 has no subsets so P2 is chosen as the starting pattern.

c. Set Pind to the empty set, since P2 has no independent patterns.

Set Psucc_matches to (P1, P2).

Set Psucc_rules out to (P3).

Set Pfail_matches to (P1, P3)
 (i.e. if P2 fails to match then P1 or P3 may still match)

Set Pfail_rules_out to (P2).

d. Call Generate_Compare_Code.

Generate a load instruction for the 1st word of input data.

Generate an AND instruction to mask off all "don't care" bits in P2

Generate a COMPARE instruction to compare the masked input data with the patterns bits for P2.

Generate an ANDNE instruction to remove P2 from the set of matching patterns if the COMPARE result is not equal (NE).

Generate a BNE instruction to branch to the code executed when P2 does not match.

Generate an AND instruction to delete P3 from the set of matching patterns since P2 matched and P3 is exclusive of P2).

e. Does W==MAXWORDS?

YES==>Generate a GOTO Return_Loc which is the location of the caller of the pattern match function.

f. Call Generate_Code recursively to generate code for the case where P2 does not match the input data.

Pset is set to Pfail_matches (P1, P3).

W=0.

g. Find another pattern in Pset with no subsets, starting with P1.

P1 has no subset in Pset.

h. Pind is set to the empty set since P1 has no independent patterns.

Set Psucc_matches to (P1).

Set Psucc_rules_out to (P3).

Set Pfail_matches to (P3).

Set Pfail_rules_out to (P1).

i. Call Generate_Compare_Code.

Generate a LOAD instruction for the 1st word of input data.

Generate an AND instruction to mask off all "don't care" bits in P1.

Generate a COMPARE instruction to compare the masked input data with the pattern bits for P1.

Generate an ANDNE instruction to remove P1 from the set of matching patterns if the COMPARE result is not equal (NE).

Generate a BNE instruction to branch to the code to execute when P1 does not match.

Generate an AND instruction to delete P3 from the set of matching patterns.

j. Does W==MAXWORDS?

YES==>Generate a GOTO Return_Loc.

k. Call Generate_Code recursively to generate code for the case where P1 does not match.

Pset is Pfail_matches (P3).

W=0.

l. Find a pattern in Pset with no subsets, starting with P3.

P3.0 has no subset in Pset.

m. Pind is set to the empty set, since P3 has no independent patterns.

Set Psucc_matches to (P3).

Set Psucc_rules_out to the empty set.

Set Pfail_matches to the empty set.

Set Pfail_rules_out to (P3).

n. Call Generate_Compare_Code.

Generate a LOAD instruction for the 1st word of input data.

Generate an AND instruction to mask off all "don't care" bits in P3.

Generate a COMPARE instruction to compare the masked input data with the pattern bits for P3.

Generate an ANDNE instruction to remove P3 from the set of matching patterns if the COMPARE result is not equal (NE).

Since the set of patterns to look for when P3 does not match is the empty set, no BNE or AND instruction is generated.

o. Does W==MAXWORDS?

YES==>Generate a GOTO Return_Loc.

p. Call Generate_Code for Pind, which is the empty set, until all code is generated.

q. The recursive calls start to return, no additional code is generated because each return includes an empty set for Pind.

Summary

The code generating system for improved pattern matching of the present invention includes the analysis of patterns to determine pattern relationships therebetween, and the dynamic generating of pattern matching code based on the known relationships so that the number of comparisons between input frame data and patterns is minimized. Although specific embodiments of the present invention are disclosed herein, it is expected that persons skilled in the art can and will design alternative code generating systems for improved pattern matching that are within the scope of the following claims either literally or under the Doctrine of Equivalents.

What is claimed is:

1. A code generating system for improved pattern matching in a protocol analyzer, said system comprising:

an interface in said protocol analyzer to monitor a plurality of protocol data units on a communication link;

a pattern set in said protocol analyzer;

a pattern relationship analyzer to identify a pattern relationship for each pair of patterns in said pattern set; and a program code generator to generate executable code unique to said pattern relationship for each of said pair of patterns in said pattern set such that said executable code requires a minimum number of comparisons to determine a match between said pattern set and at least one segment of one of said plurality of protocol data units.

2. A system according to claim 1 wherein said pattern set is a fixed number of at least one pattern originating from at least one source selected from a group comprised of: at least one pattern from a memory device, at least one pattern input by a user in real time, and at least one plurality of patterns that are commonly selected for pattern matching.

3. A system according to claim 2 including:

a non-volatile memory to save and retrieve user selected ones of said at least one pattern originating from said at least one source.

4. A system according to claim 1 wherein said pattern relationship analyzer includes:

a non-volatile memory to save said pattern relationship for each said pair of patterns in said pattern set.

5. A system according to claim 4 including:

said pattern relationship is of at least one type selected from a group comprised of: superset, subset, independent, exclusive, and identical; and said pattern relationship is determined on a word-by-word basis for each said pair of patterns in said pattern set.

6. A system according to claim 1 wherein said minimum number of comparisons includes:

an arithmetic sum of a maximum number of words in any one pattern of said pattern set and a maximum number of patterns in said pattern set.

7. A system according to claim 1 wherein said program code generator is invoked in real-time in response to said pattern relationship analyzer.

8. A system according to claim 1 wherein said program code generator is invoked in real-time in response to a user input command.

9. A code generating system for improved pattern matching in a protocol analyzer, the system comprising:

an interface in the protocol analyzer to monitor a plurality of protocol data units on a communication link;

a pattern set in the protocol analyzer;

a pattern relationship analyzer to identify a pattern relationship for each pair of patterns in the pattern set; and a program code generator to generate executable code that includes an unrolled recursive call tree having a minimum of external function calls to enhance run-time performance of the executable code, the executable code being unique to the pattern relationship for each pair of patterns in the pattern set such that the executable code requires a minimum number of comparisons to determine a match between the pattern set and at least one segment of one of the plurality of protocol data units, the minimum number of comparisons including an arithmetic sum of a maximum number of words in any one pattern of said pattern set and a maximum number of patterns in said pattern set.

10. A code generating system for improved pattern matching in a protocol analyzer, the system comprising:

an interface in the protocol analyzer to monitor a plurality of protocol data units on a communication link;

a pattern set in the protocol analyzer;

a pattern relationship analyzer to identify a pattern relationship for each pair of patterns in the pattern set; and a program code generator to generate executable code unique to the pattern relationship for each pair of patterns in the pattern set such that the executable code requires a minimum number of comparisons to determine a match between the pattern set and at least one segment of one of the plurality of protocol data units, the program code generator including:

a pattern matching code generator to identify a pattern P having no subset patterns and generate at least one decision logic block to rule-in and rule-out subsequent pattern comparisons in view of the pattern P; and a specialization comparison code generator to generate at least one decision logic block for special case ones of the pattern relationship.

11. A method of generating computer executable code for improved pattern matching in a protocol analyzer, said method comprising:

monitoring a plurality of protocol data units on a communication link by way of a protocol analyzer;

generating at least one pattern set for use in said protocol analyzer;

identifying a pattern relationship for each pair of patterns in a selected one of said at least one pattern set; and generating executable code unique to said pattern relationship for each of said pair of patterns such that said executable code requires a minimum number of comparisons to determine a match between said selected one of said at least one pattern set and at least one segment of one of said plurality of protocol data units.

12. A method according to claim 11 wherein generating at least one pattern set includes: defining a fixed number of patterns in a given pattern set wherein said fixed number of patterns originates from at least one source selected from a group comprised of: at least one pattern from a memory device, at least one pattern input by a user in real time, and at least one plurality of patterns that are commonly selected for pattern matching.

13. A method according to claim 12 including: saving and retrieving user selected ones of said fixed number of patterns in a non-volatile memory.

14. A method according to claim 11 wherein identifying a pattern relationship includes: saving said pattern relationship for each said pair of patterns in a non-volatile memory.

15. A method according to claim 14 including:

identifying said pattern relationship as at least one type selected from a group comprised of: superset, subset, independent, exclusive, and identical; and determining said pattern relationship for each word of each said pair of patterns in said pattern set.

16. A method according to claim 11 wherein generating executable code is invoked in real-time in response to identifying a pattern relationship.

17. A method according to claim 11 wherein generating executable code is invoked in real-time in response to a user input command.

18. A method of generating computer executable code for improved pattern matching in a protocol analyzer, the method comprising:

monitoring a plurality of protocol data units on a communication link by way of a protocol analyzer;

generating a pattern set for use in the protocol analyzer;

identifying a pattern relationship for each pair of patterns in the pattern set; and generating executable code that includes an unrolled recursive call tree having a minimum of external function calls to enhance run-time performance of the executable code, the executable code being unique to the pattern relationship for each pair of patterns such that the executable code requires a minimum number of comparisons to determine a match between the pattern set and at least one segment of one of the protocol data units, the minimum number of comparisons including an arithmetic sum of a maximum number of words in any one pattern of said pattern set and a maximum number of patterns in said pattern set.

19. A method of generating computer executable code for improved pattern matching in a protocol analyzer, the method comprising:

monitoring a plurality of protocol data units on a communication link by way of a protocol analyzer;

generating a pattern set for use in the protocol analyzer;

identifying a pattern relationship for each pair of patterns in the pattern set; and generating executable code unique to the pattern relationship for each pair of patterns by executing a pattern matching code process to identify a pattern P having no subset patterns and generate at least one decision logic block to rule-in and rule-out subsequent pattern comparisons in view of said pattern P; and executing a specialization comparison code generator to generate at least one decision logic block for special case ones of said pattern relationship such that the executable code requires a minimum number of comparisons to determine a match between the pattern set and at least one segment of one of the protocol data units.

20. A method comprising:

monitoring a plurality of protocol data units on a communication link by way of a protocol analyzer;

generating a pattern set for pattern matching use in said protocol analyzer;

identifying a pattern relationship for each pair of patterns in a selected one of said at least one pattern set, wherein said pattern relationship is selected from at least one of a group comprised of: superset, subset, independent, exclusive, and identical; and generating executable code unique to said pattern relationship for each of said pair of patterns such that said executable code requires a minimum number of comparisons to determine a match between said selected one of said at least one pattern set and at least one segment of one of said plurality of protocol data units, wherein said executable code includes creating an unrolled recursive call tree having a minimum of external function calls to enhance run-time performance of said executable code, and wherein said minimum number of comparisons in said executable code is an arithmetic sum of a maximum number of words in any one pattern of said pattern set and a maximum number of patterns in said pattern set, and wherein said executable code includes a pattern matching code process to identify a pattern P having no subset patterns and generate at least one decision logic block to rule-in and rule-out subsequent pattern comparisons in view of said pattern P, and a specialization comparison code generator to generate at least one decision logic block for special case ones of said pattern relationship.

21. A computer-readable medium containing computer executable instructions that generate computer executable code for improved pattern matching in a protocol analyzer, the computer executable instructions comprising:

an instruction that monitors a plurality of protocol data units on a communication link by way of a protocol analyzer;

an instruction that generates a pattern set for use in the protocol analyzer;

an instruction that identifies a pattern relationship for each pair of patterns in the pattern set; and an instruction that generates executable code unique to the pattern relationship for each pair of patterns such that the executable code requires a minimum number of comparisons to determine a match between the pattern set and at least one segment of one of the protocol data units.

22. A computer-readable medium as in claim 21 wherein the instruction that generates the pattern set defines a fixed number of patterns in a given pattern set, the fixed number of patterns originating from at least one source selected from a group comprised of a pattern from a memory device, a pattern input by a user in real time, and a plurality of patterns that are commonly selected for pattern matching.

23. A computer-readable medium as in claim 22 wherein the computer executable instructions comprise an instruction that saves user-selected ones of the fixed number of patterns in a non-volatile memory.

24. A computer-readable medium as in claim 21 wherein the computer executable instructions comprise an instruction that saves the pattern relationship for each pair of patterns in a non-volatile memory.

25. A computer-readable medium as in claim 24 wherein the computer executable instructions comprise an instruction that identifies each pattern relationship as one of the group comprising superset, subset, independent, exclusive, and identical, and determines the pattern relationship for each word of each pair of patterns in the pattern set.

26. A computer-readable medium as in claim 21 wherein the instruction that generates executable code is invoked in real-time in response to the instruction that identifies a pattern relationship.

27. A computer-readable medium as in claim 21 wherein the instruction that generates executable code is invoked in real-time in response to a user input command.

28. A computer-readable medium containing computer executable instructions that generate computer executable code for improved pattern matching in a protocol analyzer, the computer executable instructions comprising:

an instruction that monitors a plurality of protocol data units on a communication link by way of a protocol analyzer;

an instruction that generates a pattern set for use in the protocol analyzer;

an instruction that identifies a pattern relationship for each pair of patterns in the pattern set; and an instruction that generates executable code that includes an unrolled recursive call tree having a minimum of external function calls to enhance run-time performance of the executable code, the executable code being unique to the pattern relationship for each pair of patterns such that the executable code requires a minimum number of comparisons to determine a match between the pattern set and at least one segment of one of the protocol data units.

29. A computer-readable medium containing computer executable instructions that generate computer executable code for improved pattern matching in a protocol analyzer, the computer executable instructions comprising:

an instruction that monitors a plurality of protocol data units on a communication link by way of a protocol analyzer;

an instruction that generates a pattern set for use in the protocol analyzer;

an instruction that identifies a pattern relationship for each pair of patterns in the pattern set;

an instruction that generates executable code unique to the pattern relationship for each pair of patterns such that the executable code requires a minimum number of comparisons to determine a match between the pattern set and at least one segment of one of the protocol data units;

an instruction that identifies a pattern P having no subset patterns and generates a decision logic block to rule-in and rule-out subsequent pattern comparisons in view of the pattern P; and an instruction that generates a decision logic block for special case ones of the pattern relationship.

* * * * *